(12) United States Patent
Kent

(10) Patent No.: US 8,871,087 B2
(45) Date of Patent: Oct. 28, 2014

(54) DEVICE AND METHOD FOR PURIFYING WATER

(75) Inventor: Greg B. Kent, Oceanside, CA (US)

(73) Assignee: Modular Wetland Systems, Inc., Oceanside, CA (US)

( * ) Notice: Subject to any disclaimer, the term of this patent is extended or adjusted under 35 U.S.C. 154(b) by 1509 days.

(21) Appl. No.: 11/840,827

(22) Filed: Aug. 17, 2007

(65) Prior Publication Data

US 2009/0045145 A1    Feb. 19, 2009

(51) Int. Cl.
  *B01D 39/00*   (2006.01)
  *B01D 39/20*   (2006.01)

(52) U.S. Cl.
  CPC .... *B01D 39/2089* (2013.01); *B01D 2239/1233* (2013.01); *B01D 2239/08* (2013.01); *B01D 2239/0492* (2013.01); *B01D 2239/086* (2013.01); *B01D 2239/1225* (2013.01)
  USPC ....... 210/170.03; 210/503; 210/505; 210/508

(58) Field of Classification Search
  CPC .................. B01D 39/2089; B01D 2239/0492; B01D 2239/1225
  USPC ................. 210/170.03, 503, 505, 508, 747.2, 210/747.3
  See application file for complete search history.

(56) References Cited

U.S. PATENT DOCUMENTS

| | | | | |
|---|---|---|---|---|
| 4,130,487 A | * | 12/1978 | Hunter et al. | 210/85 |
| 4,228,204 A | * | 10/1980 | Matuura | 427/372.2 |
| 7,341,661 B2 | * | 3/2008 | Sansalone | 210/263 |
| 2002/0030008 A1 | * | 3/2002 | Brunner et al. | 210/483 |
| 2003/0217954 A1 | * | 11/2003 | Towndrow | 210/97 |
| 2004/0121691 A1 | * | 6/2004 | Klein | 442/389 |
| 2005/0103721 A1 | * | 5/2005 | Fritze | 210/744 |
| 2007/0179237 A1 | * | 8/2007 | Sekine | 524/492 |
| 2007/0220852 A1 | * | 9/2007 | Lifshutz et al. | 55/486 |
| 2008/0023405 A1 | * | 1/2008 | Rawson et al. | 210/688 |

* cited by examiner

*Primary Examiner* — Tony G Soohoo
*Assistant Examiner* — Peter Keyworth
(74) *Attorney, Agent, or Firm* — Procopio, Cory, Hargreaves & Savitch LLP

(57) ABSTRACT

A device and method for purifying waste water and stormwater flows by passage through a filter, which can be manufactured in various configurations. The filter has a broad range of thickness ranging from 1 mm to 20 meters. The filter is comprised of fibers from a melt of composition of 50% silicon dioxide, 15% aluminum oxide, 15% calcium oxide, 10% magnesium oxide, and other various oxides at lower percentages. At least the majority of fibers having a mean diameter of 4 microns and a mean length of 3 mm. The fiber solids of content of the material are at most 35% of the volume at a flow rate greater than 1 inch per hour to remove various pollutants from the water flow.

12 Claims, 6 Drawing Sheets

DEVICE AND METHOD FOR PURIFYING WATER

FIELD OF THE INVENTION

The present invention relates, in general, to a device, filtration media, used to purify water and a method of using the same. More particularly, the present invention relates to a filtration media which removes pollutants from water and treats stormwater runoff or other grey water. This filtration media and method can be used in conjunction with many existing filtration systems and devices.

BACKGROUND OF THE INVENTION

Water treatment systems have been in existence for many years. These systems treat stormwater surface run-off or other polluted water. Stormwater surface runoff is of concern for two main reasons: one because of the effects of its volume and flow rate, and two, because of the pollution and contamination it can carry. The volume and flow rate of stormwater is important because high volumes and high flow rates can cause erosion and flooding. Pollution and contamination are important because stormwater is carried into our rivers and streams, from there into our lakes and wetlands, and furthermore because it can eventually reach our oceans. Pollution and contamination that is carried by stormwater can have adverse affects on the health and ecological balance of the environment.

Devices, systems and methods that remove or reduce the pollutants and contaminates and/or control peak flows and volumes are often referred to as best management practices or BMPs. BMPs utilize natural means, artificial or man-made means, and even combinations of either and/or both. Some examples of these BMPs include trash filters, sedimentation basins, retention and detention ponds, wetlands, infiltration trenches, grass swales, various types of media filters, and various types of natural filter systems including sand filters, and aggregate filters including natural and artificial wetlands. These BMPs typically use one or more mechanisms to remove the pollutants and contaminates. These mechanisms include sedimentation, filtration, absorption, adsorption, flocculation, stripping, leaching, bioremediation, and chemical process including oxidation reduction, ion exchange, and precipitation.

Furthermore, stormwater treatment systems can also be classified in relationship to the treatment level in which they are being used. In this respect the term treatment is generally used to describe the unit processes that that are used to reduce the quantities of pollutants and containments in stormwater runoff. For example, basic or pre-treatment typically refers to the removal of gross solids, sediments and larger debris through the processes of settling and screening, while enhanced or advanced treatment typically refers to processes for reducing targeted pollutants; filtration being the main form of enhanced treatment for stormwater. Filtration utilizes a combination of physical, chemical, and biological processes. Types of filtration greatly vary dependent on the media use. Medias can be both inert and/or sorbent and are also strongly linked to natural biological processes that thrive in and/or around the media environment.

There is, thus, a need for a device which is a filtration media which can clean water on its own or be incorporated into existing filtration systems. A device which can treat both wastewater and stormwater. A filtration media which can treat high levels of specific pollutants and contaminants.

SUMMARY OF THE INVENTION

This invention has overcome the downfalls of prior art. It is related to unique and novel method and device for treating polluted water flows, specifically point and non-point source stormwater and wastewater flows. Such flows contain various pollutants in various concentrations that have detrimental effects on the environment and human health. These pollutants/substances include, but are not limited to: sediments, gross debris, construction material, Total Suspended Solids, trash and litter, chemicals, grease and oil, hydrocarbons including polycyclic aromatic hydrocarbons and total petroleum hydrocarbons, particulate and dissolved heavy metals, Total Dissolved Solids, turbidity, conductivity, inappropriate pH, color, total phosphorous, ortho-phosphate, total nitrogen, total kjeldahl nitrogen, nitrate, bacteria/pathogens, herbicides, and pesticides.

These pollutants have various physical, chemical, and biological characteristics such as size, specific gravity, charge, form. Because of these varying characteristics, different filtering and capture processes and techniques have traditionally been implemented, in series, to remove specific pollutants. These existing processes and techniques have proven effective in wastewater treatment where flows are generally low and consistent, however not effective in stormwater conditions because flows are inconsistent and highly variable in flow and volume. The device disclosed in this application, the filtration media, and method have proven to be successful and feasible strategies for both wastewater treatment (sewage) and stormwater treatment, where flows are low and consistent, or, in the alternative, inconsistent and highly variable.

This device is a passive filter method and filtration media that has a specific and engineered combination of physical, chemical, and biological characteristics that will allow it to effectively address most or all of the above pollutants of concern in the quickest time possible. Depending on flow or volume based design, the time range for contact time with a filter media is from 1 seconds to a few hours and therefore requires an innovative and unique method and device that will effectively treat the various pollutants of concern in a very short time.

This invention uses a combination of fibers consisting of high-alumina low silica (HT) wool as filter material. This synthetic vitreous fiber is made of inorganic material and contains alumina and/or calcium silicates. This filtration media consists of inert vitreous silicate mineral wool bonded with a thermosetting phenolic resin which has been urea extended. Only high-alumina low-silica fiber is well suited for stormwater applications because it is one of only a few fibers that are proven not to have adverse affects on the environment or health of humans, animals, and plants. These fibers have a mean diameter of 4 microns and a mean length of 3 mm. The fibers are bonded together and can be shaped in to sheets, granules or blocks of filtration media. This filtration media, sometimes referred to as wool, is beneficial due to its specific chemical composition. This device has a high content of aluminum oxide, giving the material an inherent ability to carry a slightly positive charge. This positive charge can be enhanced with the addition of an aluminum-oxide coating on the surface of the fibers. This positive change assists in the binding, and thus removal of organic, inorganic and microbiological contaminants. Electrostatic attraction generated by the positively charged filter media surface increases removal of the negatively charged pollutants such as phosphates, viruses and bacteria.

This filtration media allows for both perpendicular and parallel flow. This characteristic gives it great advantages over prior materials in that it can be used in the perimeter or a round or rectangular structure such as, but not limited, to catch basins. In this configuration the material of the effluent end of the media can be mounted, placed, or set between the wall of the structure, thus, allowing the water to flow through the media coming from one direction and allowing it to make a 90 degree turn and flow in a different direction. In one embodiment, the media undergoes a pre-treatment process which can further assist in its filtration functions. This filtration media and method can be used as a complete stormwater and waste water treatment system, or combined with existing treatment systems to provide added treatment.

BRIEF DESCRIPTION OF THE DRAWINGS

The accompanying drawings, which are incorporated in and constitute a part of the specification, illustrate embodiments of the invention and, together with the description, serve to explain the objects, advantages, and principles of the invention. In the drawings.

DETAILED DESCRIPTION OF PREFERRED EMBODIMENTS

After reading this description it will become apparent to one skilled in the art how to implement the invention in various alternative embodiments and alternative applications. However, all the various embodiments of the present invention will not be described herein. It is understood that the embodiments presented here are presented by way of an example only, and not limitation. As such, this detailed description of various alternative embodiments should not be construed to limit the scope or breadth of the present invention as set forth below.

Figure 1:
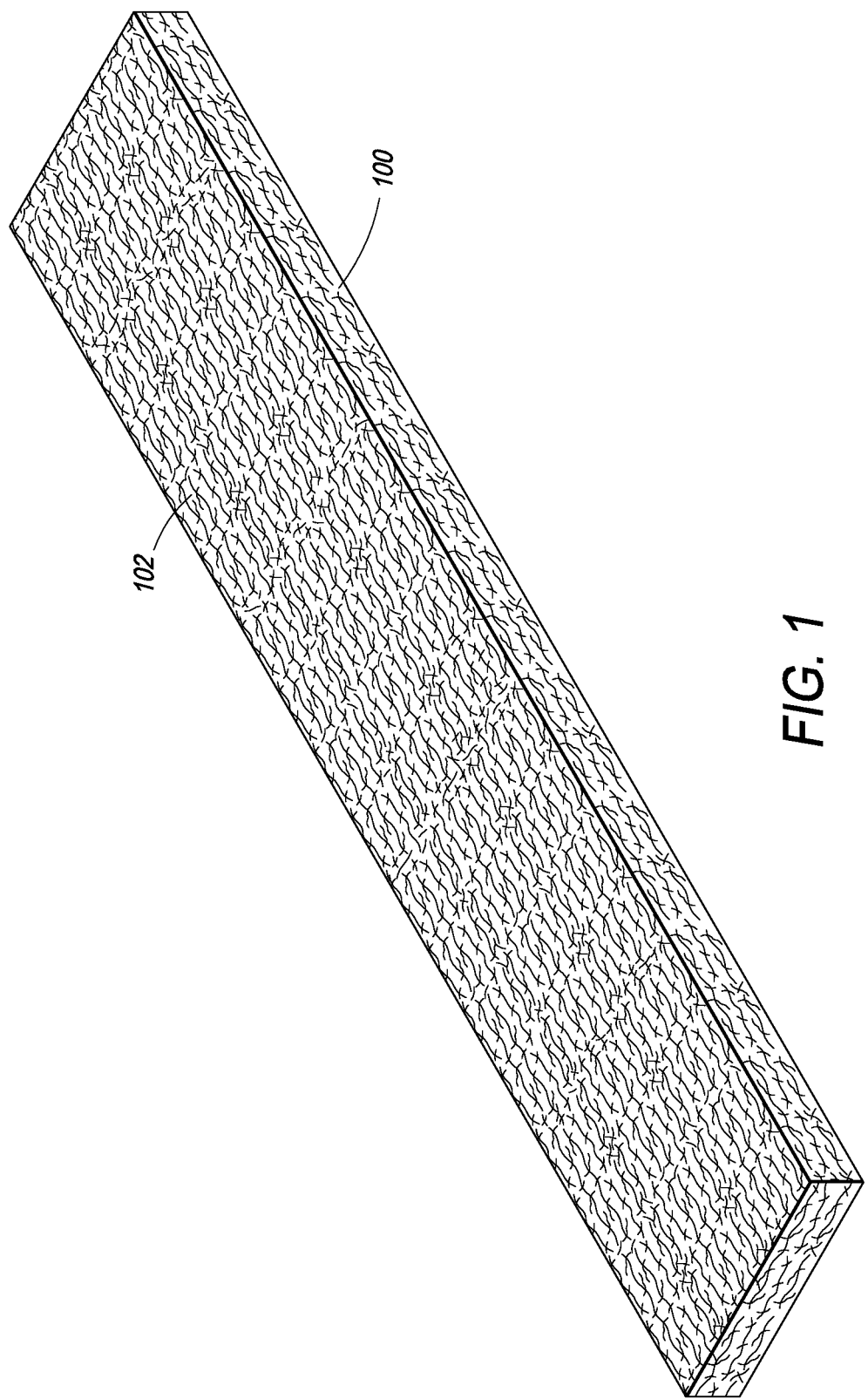
FIG. 1 is a perspective view of an embodiment of a device for purifying water.

With reference to FIG. 1, a device for filtering water ("device") 100 is shown and displayed. This device 100 is made up of filtration media composed of numerous intertwined fibers 102 which have been bonded together. The fibers 102 are bonded together with a thermosetting phenolic resin which has been urea extended. The fibers 102 have a diameter of 1 to 40 microns and a length of 1 to 20 mm each. These fibers 102 are derived from a melt of 30 to 60% of silicon dioxide, 10 to 40% of aluminum oxide, 10 to 20% of calcium oxide, 5 to 20% of magnesium oxide, and 1 to 20% of one or more other types of oxides. The filtration media can be formed in blocks, sheets, or granulets of various thicknesses and lengths depending on the use. The fiber density ranges between 5 to 35% of the volume of each device 100 while the open space between the fibers 102 which allows for water or air to pass through ranges from 65 to 95% of the total volume. One benefit to this device 100 is that it allows for water flow from both perpendicular and parallel directions, thus enabling it to be used in multiple applications. It can be used as a complete stormwater treatment or wastewater treatment system, or in combination with existing treatment systems, as shown below in FIG. 4 through 6, to provide added treatment.

Stormwater or other water is passed through the device 100. The influent water enters the filtration media of the device 100 and flows through the fibers 102 where the pollutants, including but not limited to bacteria, phosphorus, and viruses, and other materials are removed. This device 100 functions to remove pollutants, bacteria, viruses and phosphorus from the water which is passed through it. The surface of the filtration media of the device 100 creates electrostatic attraction generated by the positively charged surface and fibers 102 within the device 100; this positive charge assists the removal efficiencies as it attracts and binds the negatively charged pollutants.

A process of coating the surface of the filtration media with aluminum oxide can be used to further increases the pollutant removal capabilities of the fibers 102 by increasing the electrostatic attraction. To accomplish this, aluminum-based substances can be added, mixed or bonded to the fibers 102. While there are many substances which can be used, the preferred substance is an aluminum nitrate solution. The preferred method is saturating the filtration media of the device 100. Once the material is saturated, the device 100 is allowed to dry. The treated material can be cured by exposure to high temperatures or can be used without the curing process.

Figure 2:
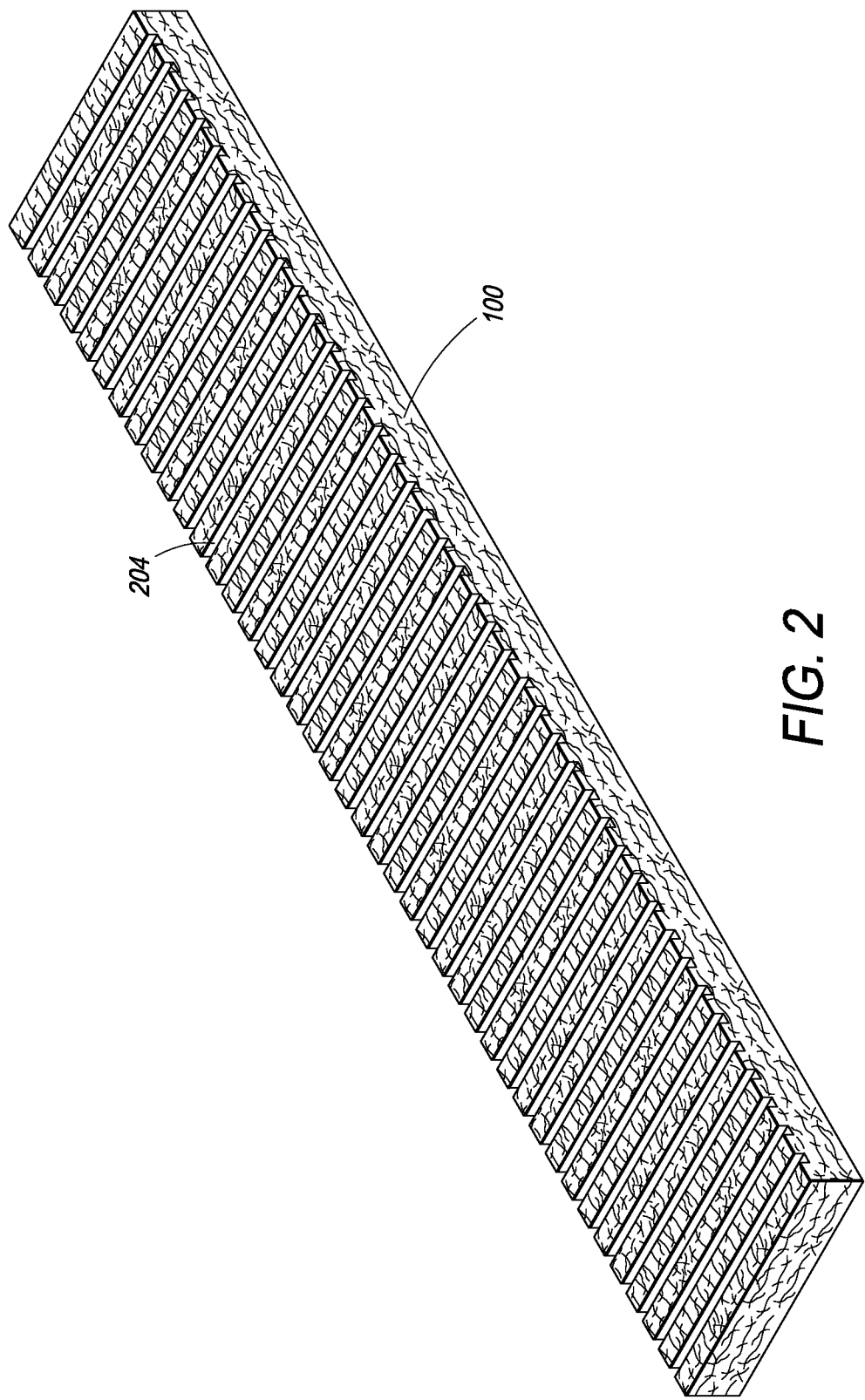
FIG. 2 is a perspective view of an embodiment of a device for purifying water which has been modified to increase its surface area by the addition of channels.
Figure 3:
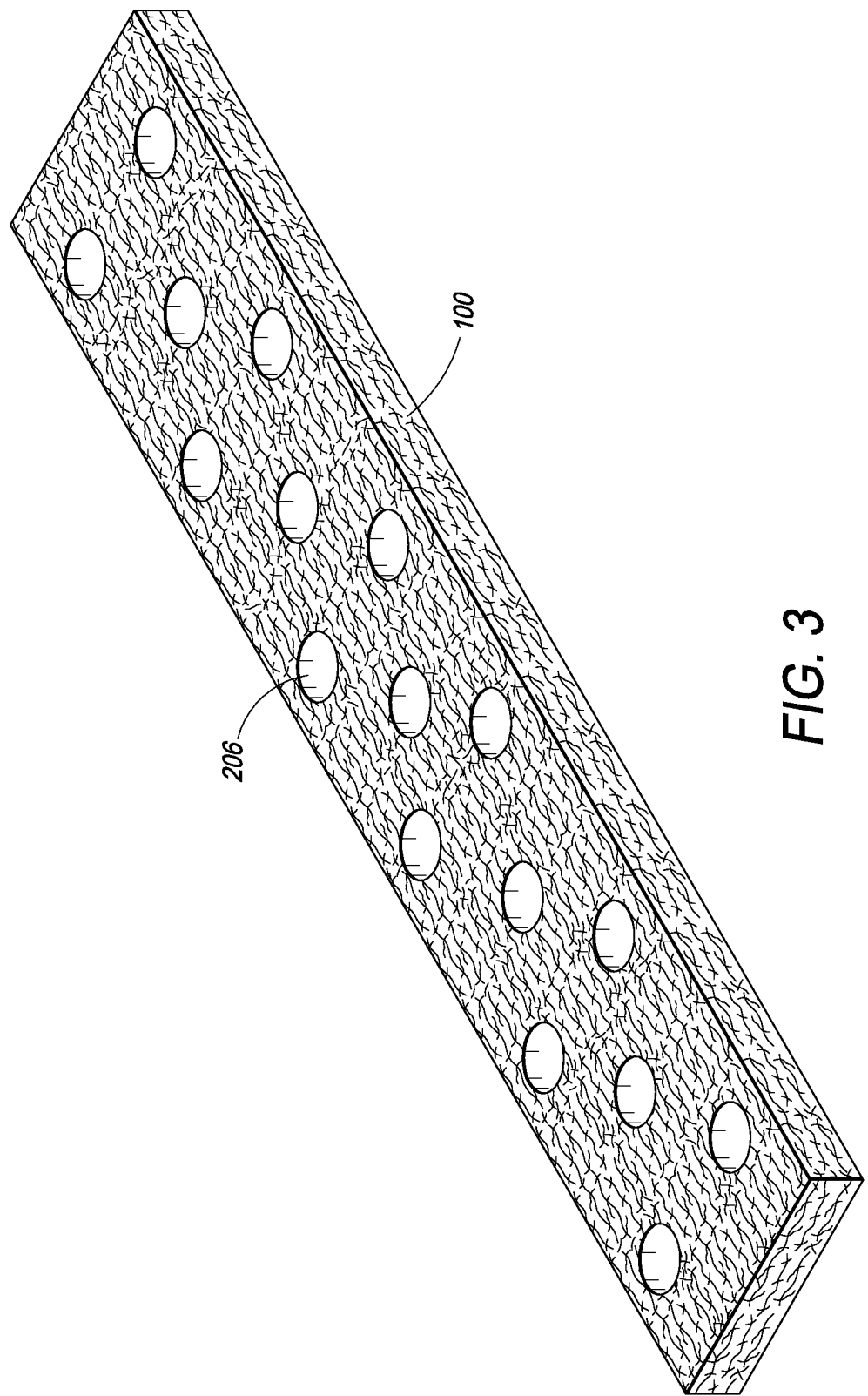
FIG. 3 is a perspective view of an embodiment of a device for purifying water which has been modified to increase its surface area by the addition of holes that do not penetrate the media.

With reference to FIGS. 2 and 3, a surface area increasing mechanism will be described. These mechanisms allow for the device 100 to be further modified to increase its surface area, thereby increasing its loading capacity for pollutants and prolonging the individual density materials clogging rate. An increase in the surface area by this mechanism will allow for more pollutants to be removed from the water passing through the device 100. These modifications are made to the surface of the device 100 on the influent side where the water enters the device 100. FIG. 2 is a perspective view of an embodiment of a device 100 which has been modified by adding channels 204 to the surface. There can be one or more channels 204 drilled either horizontally, vertically or both horizontally and vertically into the surface of the media. The depth of these channels 204 can vary depending on the thickness of the media; however, they never extend all the way through the filtration media of the device 100. FIG. 2 shows a device 100 where there have been numerous channels machined into its surface.

FIG. 3 is a perspective view of an embodiment of a device 100 which has been modified by the machining of holes 206 into its surface. These holes 206 can be machined at various sizes, depths, and diameters. The only restriction on the depth of the holes 206 is that they must be less than the thickness of the media. There can be one or more holes 206 drilled into the surface of the device 100. In general, the more holes, the greater the surface area of the device 100. The surface of the device 100 can also be agitated by various hand tools and mechanical devices to create an inconsistent rough texture to the media, which will increase the surface area of the device 100. The above listed alterations of the device 100 are only a few of the alterations which can be made to increase the surface area and the efficiency of the device 100.

Figure 4:
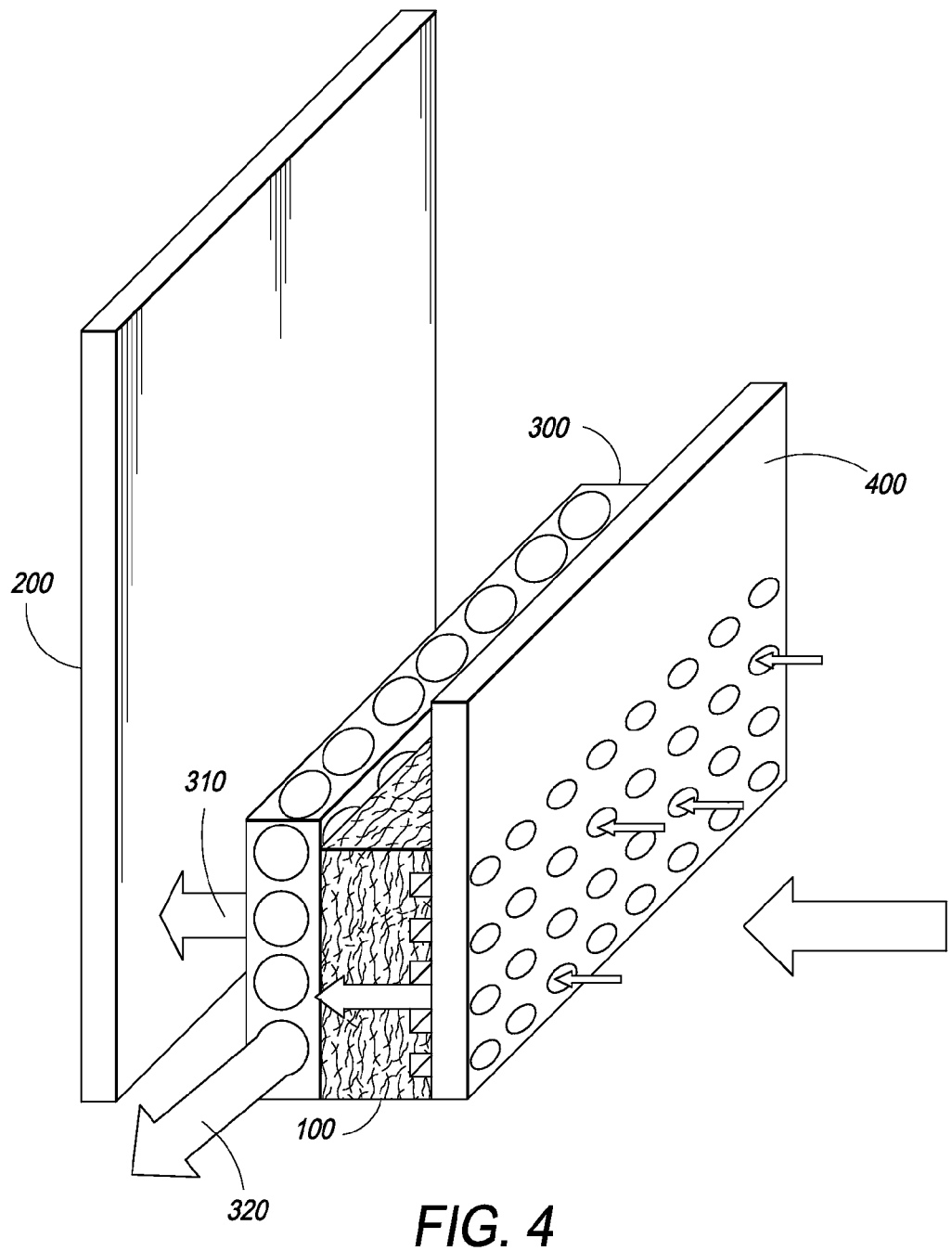
FIG. 4 is a perspective view of an embodiment of a device and method for purifying water wherein it has been placed between a porous flow-through matrix and an influent shield.

With reference to FIG. 4, an embodiment of the device 100 is shown being placed between an influent shield 400 and a porous flow-through matrix 300. This combination results in a method to further clean the polluted water. The influent shield 400 protects high velocity water currents from making direct contact with the surface of the device 100 and harming the surface. The influent shield 400 also conveys the water to the surface in a controlled manner, in order to provide uniform flow to the filtration media surface. The influent shield 400 will also provide support of the vertical, angled, or horizontal media column. To provide structural support of the media both between and during stormwater and wastewater flow, the effluent side of the device is supported by a flow-through matrix 300. The flow-through matrix 300 is a ridged structure equipped with multiple holes so the effluent water flowing out of the device 100, which has been treated by the device 100, can flow through the flow-through matrix 300. In an alternate embodiment, the flow-through matrix 300 does not have holes but is just a porous, ridged material. The flow through matrix 300 directs the water flowing out of the device to allow discharge of the treated water as can be seen at arrows 310 and 320. Here the matrix 300 allows for both perpendicular and parallel discharge of the water. In this configuration the device 100 can be used as a perimeter filter for round or rectangular structures, such as, but not limited, to catch basins. In FIG. 4, a cross section of the outer wall of the catch basin is shown as 200.

Figure 5:
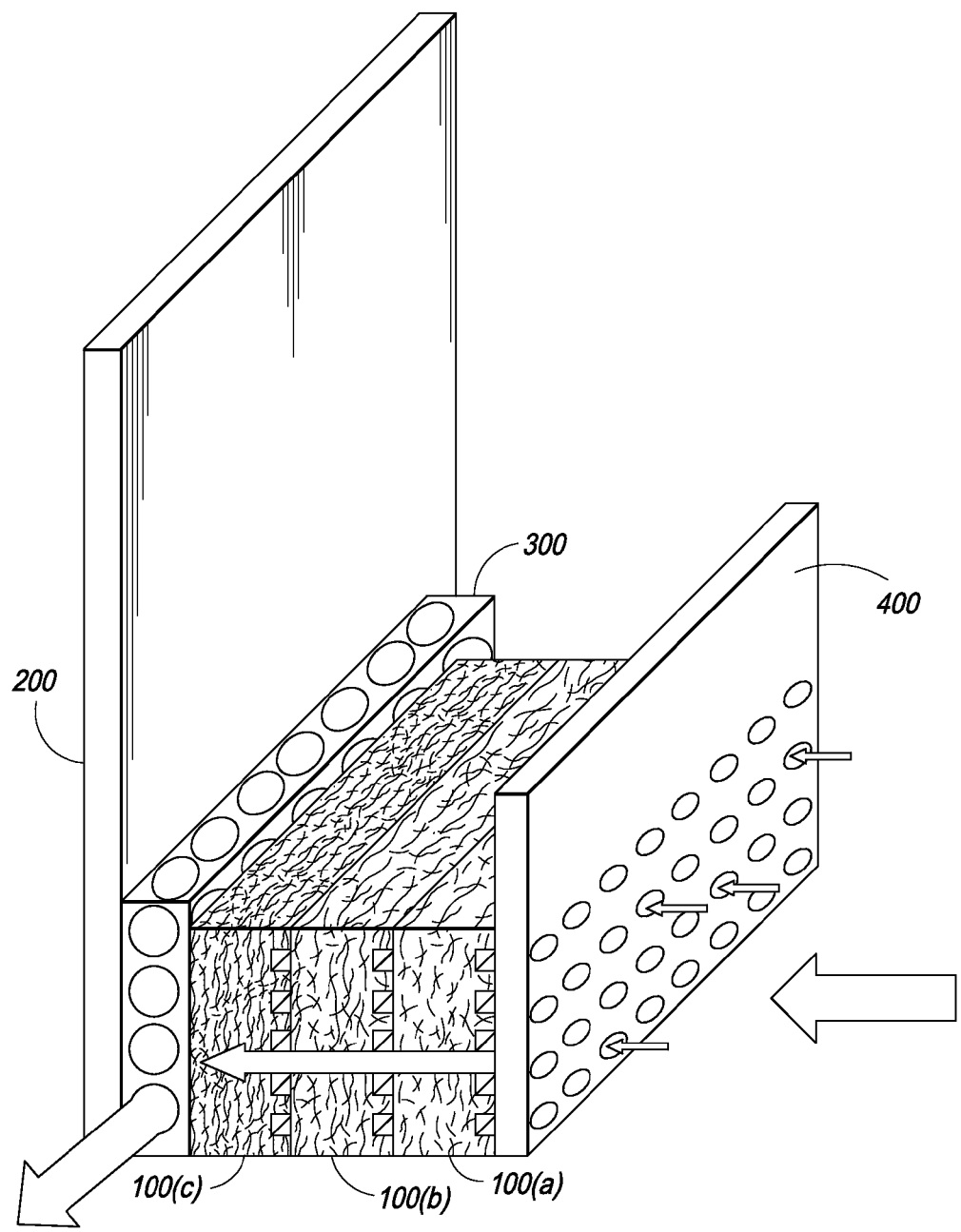
FIG. 5 is a perspective view of an embodiment of a device and method for purifying water wherein multiple devices shaped as blocks of filtration media have been bonded together and placed between a influent shield and a porous flow through matrix.

With reference to FIG. 5, multiple devices (100(a), 100(b) and 100(c)) shaped as blocks of filtration media have been bonded together and placed between an influent shield 400 and a porous flow-through matrix 300. The use of multiple combined devices 100(a), 100(b) and 100(c) creates a long lasting and highly effective system. The multiple devices 100(a), 100(b) and 100(c) can be of varying densities. In FIG. 5, the first device 100(a) on the influent side is the least dense, the device 100(b) in the middle is more dense, and the device 100(c) on the effluent end is the most dense. This multi-density media device creates multiple levels of treatment. Each device 100 of a different density protects the next device from coarser particles, therefore, extending the life of the system. The devices 100 will encounter a wider range of particles ranging from 0.1 to 5000 microns. The devices 100 (a), 100(b), 100(c) layered together can be of varying thicknesses. This system of multiple devices 100(a), 100(b), 100 (c) has a higher capacity for pollutant removal and has prolonged clogging rates.

In the configuration shown at FIG. 5, the effluent end of the device 100 can be mounted, placed, or set against the wall 200 of an existing structure, thus, allowing water to flow through the media in one direction and then making a 90 degree turn and flow in another direction to the end of the catch basin structure. The material used on the effluent end of the device 100 can be attached to the wall with mounts.

Figure 6:
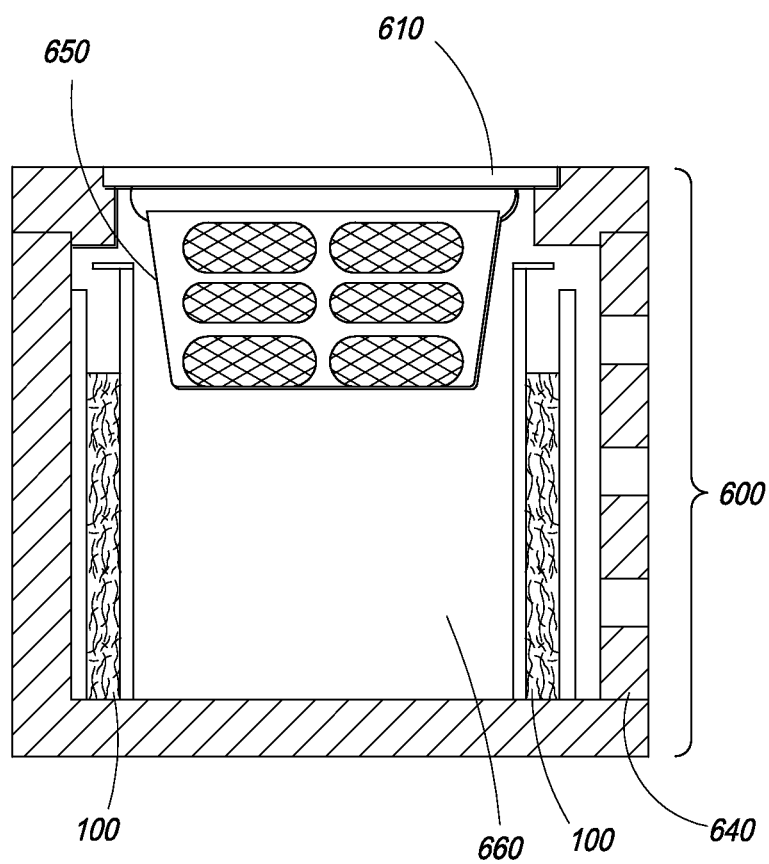
FIG. 6 is a end cross sectional view of a catch basin with a device to increase the filtration capabilities.

With reference to FIG. 6 an existing stormwater catch basin 600 is shown where a device 100 have been added to increase the filtration capabilities. FIG. 6 shows an end cross sectional view of a catch basin where the device 100 is shown on either side of the chamber 600. The device 100 in this embodiment is formed into a sheet and has been wrapped around the interior surface of the catch basin 600. Wastewater or stormwater flows into the grate 610 which sits at ground level, commonly on the street or curb. The contaminated water then flows through the first filter 650 of the catch basin 600 and into the interior chamber 660. The contaminated water then flows through the device 100 where it is further filtered and out the pipes located at the catch basin's wall 640. The device 100 can be inserted into many existing filtration devices such as this catch basin 600 to further enhance the removal of pollutants.

This invention discloses a method for treating wastewater or stormwater whereby fibers 102 from a melt of oxides are bonded together with a thermosetting phenolic resin which has been urea extended. The bonded fibers are shaped into rolls, granulates, sheets or blocks. Contaminated or polluted water is passed through the bonded fibers 102 where the pollutants are captured. The surface of the bonded fibers 102 can be modified to increase the surface area as disclosed above. The fibers 102 can be made in various densities as disclosed above. Multiple blocks of the fibers 102 can be attached together to increase the pollutant capturing ability of the fibers 102. In order to further increase the treatment of the water, aluminum oxide can be added to the fibers 102.

The above description of disclosed embodiments is provided to enable any person skilled in the art to make or use the invention. Various modifications to the embodiments will be readily apparent to those skilled in the art, the generic principals defined herein can be applied to other embodiments without departing from spirit or scope of the invention. Thus, the invention is not intended to be limited to the embodiments shown herein but is to be accorded the widest scope consistent with the principals and novel features disclosed herein.

The invention claimed is:

1. A water treatment device, comprising:
    a filter material of a thickness from 1 mm to 20 meters composed of fibers from a melt of silicon dioxide, aluminum oxide, calcium oxide, magnesium oxide, and one or more other types of oxides,
    wherein the fibers of the device have a diameter of 1 to 40 microns and a length of 1 to 20 mm;
    wherein a surface of the filter material is coated with aluminum oxide;
    wherein the filter material has a positive charge, and
    wherein the filter material is formed into at least one of blocks, sheets or granules used for treatment of wastewater or stormwater; and
    a porous matrix support material disposed on an effluent side of the filter material, wherein the porous matrix support material includes a series of horizontal and vertical holes through which an effluent passes, and wherein the porous matrix is configured to allow for both perpendicular and parallel discharge of effluent.

2. The device of claim 1, wherein the fibers comprise 5 to 35% of the volume of the filter material and the open space which accommodates water or air flow comprises 65 to 95% of the volume.

3. The device of claim 1, wherein the fibers are coated with thermosetting phenolic resin which has been urea extended.

4. The device of claim 1, wherein a mechanism is employed to increase the surface area.

5. The device of claim 4, wherein the mechanism to increase the surface area is done by machining channels into the device.

6. The device of claim 4, wherein the mechanism to increase the surface area is done by machining holes of various depths into the surface of the filtration media.

7. The device of claim 1, wherein the water treatment device is part of at least one of a stormwater treatment system and a stormwater drainage infrastructure.

8. A filtering system, comprising:
    filtration media having a positive charge and comprised of fibers from a melt of oxides bonded together with phenolic resin shaped into at least one of blocks and sheets, the filtration media including an influent side and effluent side;
a porous protective covering device of material placed on the influent side of the filtration media; and
a porous matrix support material on the effluent side of the blocks or sheets, wherein the porous matrix support material includes a series of horizontal and vertical holes through which an effluent passes, and wherein the porous matrix is configured to allow for both perpendicular and parallel discharge of effluent.

9. The system of claim 8, wherein the blocks or sheets of bonded fibers include at least one of internal, vertical, angled and horizontal perforated material which acts as a discharge mechanism for water which has been treated by the filtration media.

10. The system of claim 8, wherein the filtration media includes a height from 1 inch to 20 feet.

11. The system of claim 8, wherein a water treatment device is part of at least one of a stormwater treatment system and a stormwater drainage infrastructure.

12. The system of claim 8, wherein a surface of the filtration media is coated with aluminum oxide.

* * * * *